United States Patent [19]
Korbuly et al.

[11] 3,948,500
[45] Apr. 6, 1976

[54] SHOCK ABSORBERS FOR MOORING GUARDS

[75] Inventors: Gergely Korbuly, Courbevoie; Denis Hamel, Saint Mande, both of France

[73] Assignee: Pneumatiques Caoutchouc Manufacture et Plastiques Kleber-Colombes, Colombes, France

[22] Filed: July 18, 1974

[21] Appl. No.: 489,607

[30] Foreign Application Priority Data
July 18, 1973  France .............. 73.26237

[52] U.S. Cl. .................. 267/140; 61/48; 114/219
[51] Int. Cl.² ........................................ F16F 7/12
[58] Field of Search .......... 267/140, 141, 152, 153; 61/48; 114/219; 293/1, 60, 87, 70

[56] References Cited
UNITED STATES PATENTS

| | | | |
|---|---|---|---|
| 2,893,665 | 7/1959 | Paulsen | 267/153 |
| 3,235,244 | 2/1966 | Hein | 267/153 |
| 3,288,405 | 11/1966 | Johnson | 267/153 |
| 3,418,815 | 12/1968 | Kumazawa | 267/140 |
| 3,708,988 | 1/1973 | Miura | 267/140 |
| 3,716,999 | 2/1973 | Middelbeek | 267/140 |
| 3,831,923 | 8/1974 | Meldrum | 267/153 |

FOREIGN PATENTS OR APPLICATIONS

| | | | |
|---|---|---|---|
| 1,241,315 | 8/1971 | United Kingdom | 267/140 |
| 1,570,438 | 5/1969 | France | 61/48 |

*Primary Examiner*—James B. Marbert
*Attorney, Agent, or Firm*—Craig & Antonelli

[57] ABSTRACT

A rubber shock absorber for a mooring guard comprising a hollow rubber element of revolution having a generally truncated conical shape adhering to a base plate with an angle of inclination A of its conical wall in the order of 60° – 85°. The rubber element has a hollow section with an axial length H and a conical wall with a radial thickness E so dimensioned that the outer diameter D of the small base of the rubber element at right angles to the hollow section is substantially equal to the inner diameter d of the large base of the section. In this arrangement, the conical wall of the rubber element operates essentially through bending and extension towards the outside under a crushing stress comprising an axial component and provides lateral stability to counteract the tangential components of this stress.

23 Claims, 16 Drawing Figures

SHOCK ABSORBERS FOR MOORING GUARDS

BACKGROUND OF THE INVENTION

1. Field of the Invention

The present invention relates to rubber shock absorbers for mooring guards used to protect boats and ocean or river dock structures such as quays, jetties, mooring posts, etc. These rubber shock absorbers are generally placed between the stationary part of the dock such as the vertical wall of a quay and a protective shield distributing the mooring stresses exerted by the boat or ship over a plurality of shock absorbers and distributing the reactions of the latter over a sufficiently wide surface area of the hull to avoid deformation thereof.

2. Description of the Prior Art

Rubber shock absorbers consisting of hollow elements in the form of sleeves or tubular cylindrical rolls or in the form of elongated sections having a trapezoidal transversal section have already been used for this purpose. If these shock absorbers have suitable dimensions, their curve of deformation under compression will be such that the bending which occurs is at first approximately proportional to the stress, the shock absorber accordingly having increasing stiffness to counteract elastically minor stresses. Thereafter, the bending must increase more rapidly than the stress exerted so as to resist average stresses by elastically straightening itself up without the action exerted on the boat being exaggerated and risking damage to the hull. Then, at the termination thereof, when the possibility of bending the shock absorbers is practically eliminated, the compression stiffness increases considerably once again so as to protect the mooring guard and the dock structure to the limit of admissible stress.

However, the mooring stress exerted by a boat on the guard is rarely purely perpendicular to the mooring plane. It is often oblique and it gives rise to tangential components in the absorbers, that is, parallel to the bearing faces of the absorbers. Shock absorbers in the form of tubular rolls or elongated sections having a trapezoidal section are not suitable for resisting these tangential components; their resistance or stability is insufficient when these components are transversally directed as the rolls tend to roll themselves and the trapezoidal sections tend to rest on their sides. On the other hand, their resistance is too great when these tangential components are directed longitudinally with respect to the direction of the shock absorbers.

The use of shock absorbers in the form of cylindrical hollow sleeves has also been proposed. These operate by axial compression between their bearing surfaces under the action of a mooring stress normally exerted on the shield and/or the quay. This type of absorber first counteracts any minor stresses through compression and then as the stress increases, buckling occurs towards the outside of the walls of the sleeve accompanied by stabilization or reduction of the stiffness to the point of almost total crushing, at which point the stiffness increases rapidly. Once again, these shock absorbers have a low resistance to oblique or tangential stresses which tend to lay them on their sides.

Shock absorbers have also been proposed in which a conical hollow rubber element rests at its ends on bearing surfaces which are oblique or even parallel to its axis such that the rubber element is telescopically deformed by an axial stress operating with a shearing action or with shearing and compressing combined. The load/deformation curve of this type of shock absorber under increasing axial stress is more progressive and this stiffness may be proportioned by selecting the conical shape of the element and the inclination of the bearing surfaces so as to cause the rubber to work either mainly with a shearing action (minimal stiffness) or by compression (considerable stiffness). However, with this type of conical shock absorber, it is generally necessary to laminate the rubber element with metal plates to provide it with lateral stability which produces far more costly parts than the homogeneous molded rubber parts. The rubber/metal connections thereof are also more subject to deterioration with age. In addition, the lateral deformation capacity and thus the absorption of tangential components of oblique stresses are compromised by the need to obtain satisfactory axial bending paths.

SUMMARY OF THE INVENTION

The present invention relates to shock absorbers for mooring guards consisting of a hollow rubber element of generally truncated conical shape adhering to a base plate with the angle of inclination of its conical wall being 60° – 85° with respect to this base plate. The object of the present invention is to make the rubber element operate essentially by bending and extending towards the outside rather than by compression under the crushing action directed along the axis of rotation of the rubber element. In this way, it is hoped to obtain suitable stiffness for the major part of the period of deformation. Another object of the present invention is to provide these shock absorbers with good lateral stability so that they can absorb by means of elastic deformation the tangential components of oblique stresses in all directions.

According to the invention, in a mooring shock absorber having the generally truncated shape defined above, the axial length (H) of the hollow part of the rubber element and the radical thickness (E) of its conical wall are such that the outer diameter (D) of the small base of the rubber element aligned with or at the level of the top or the narrow base of the hollow part is substantially equal to the inner diameter $d$ of the wide base of the hollow part or section.

Various embodiments of shock absorbers intended for mooring guards according to the invention will be described in further detail hereinafter with reference to the accompanying drawings.

DESCRIPTION OF THE PREFERRED EMBODIMENTS

Figure 1:
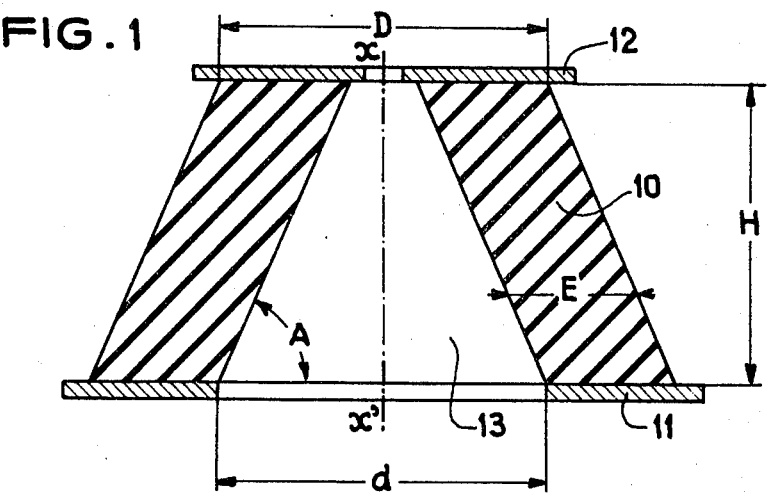
FIGS. 1 and 2 represent an elevational view of an axial section and a vertical section of a conical shock absorber (truncated) in the rest state and in the axially compressed state.

The shock absorber shown in FIG. 1 comprises a hollow rubber (e.g., natural rubber, SBR, neoprene, etc.) element 10 of generally truncated conical shape adhering at its ends to metal plates 11 and 12 which are parallel to each other and perpendicular to the axis $xx'$ of the element 10. These plates are made, for example, of steel and are stuck or glued to the rubber using conventional, well known adhesives such as Bostik or Chemosil. The base plate 11 is for securing the shock absorber to the fixed part of the structure, for example, to the vertical face of a quay and the end plate 12 is used to mount a shield, or vice versa. The inner hollow section 13 of the element 10 is also truncated in shape and it extends axially from one end of the element 10 to the other. The angle of inclination of the conical wall of the element 10 has a value A of between 60° and 85° inclusive, and preferably of about 70°— both as concerns the outer face and the inner face defining the hollow section 13, so that the radial thickness E of the wall of the element 10 is constant from one end of the shock absorber to the other.

It was found that with a shock absorber having the generally truncated shape defined above, to obtain the desired aims, it was necessary for the axial length H of the hollow section 13 (which is merged in this case with the axial length of the element itself) and the radial thickness E of the wall to be such that the resulting outer diameter D of the small base of the element is the same size as the diameter $d$ of the larger base of the hollow section 13. Preferably, the diameters D and $d$ are equal but a slight tolerance margin is admissible.

Figure 2:
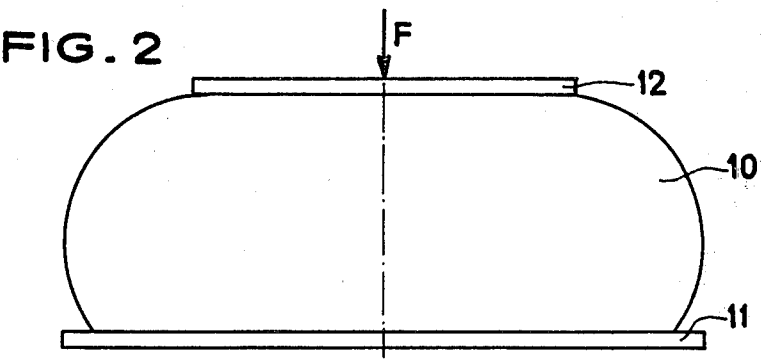

When the shock absorber is axially compressed, for example, owing to a mooring stress or shock F directed along the axis, the conical wall of the element 10 bends and bulges towards the outside as shown in FIG. 2 such that the intermediate parts of the wall situated between the end plates 11 and 12 increase in diameter. The rubber of the conical wall thus both bends and extends to absorb the axial crushing stress F. Owing to the fact that the outer diameter D of the small base of the element 10 is equal to the inner diameter $d$ of the wide base of the hollow section, the element is subjected to this bending/extending deformation as soon as the stress F is exerted thereon. In other words, this element is not first subjected strictly to a compressive stress followed by rapid buckling of the wall as is the case with cylindrical sleeves.

As indicated above, a certain tolerance margin is admissible as far as the equality of diameters D and $d$ are concerned; it is understood that if D is greater than $d$, the stiffness through compression will tend to be increased and if D is smaller than $d$, this stiffness by compression will tend to decrease, particularly at the commencement of deformation of the shock absorber. This tolerance margin must also remain relatively small so that the wall of the element operates essentially through bending/extension with an appropriate stiffness. The conical shape of the rubber element also provides the shock absorber with lateral stability enabling it to elastically absorb the tangential components produced in all directions by oblique mooring stresses without resting or collapsing on its side. This lateral stability is raised to a high level by the shape of the rubber element defined above since the height H of the element is limited as a function of the value of the thickness E and the angle of inclination A so as to maintain — at least substantially — the correspondence between the diameters D and $d$.

This lateral stability of the element is obviously increased when the angle of inclination A of the wall decreases but when given thickness E, the height H and thus the capacity of axial deformation of the element also decrease. A good compromise between the axial deformation capacity and the lateral stability can be obtained when the ratio between the height H and the thickness E of the wall remains between 2 and 4, inclusive, i.e., from 2 to 4.

Figure 3:
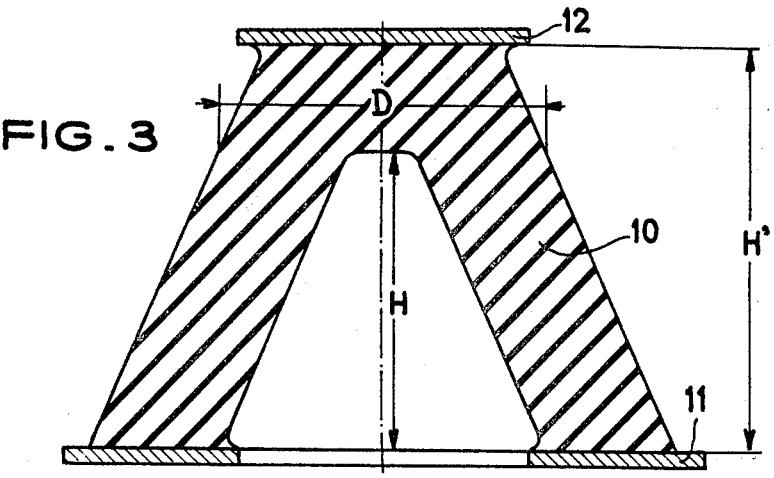
FIGS. 3, 4, 5 and 6 are elevational axial sectional views of other embodiments of shock absorbers including a conical truncated rubber element having an additional rubber layer adhesive to the smaller base thereof.
Figure 4:
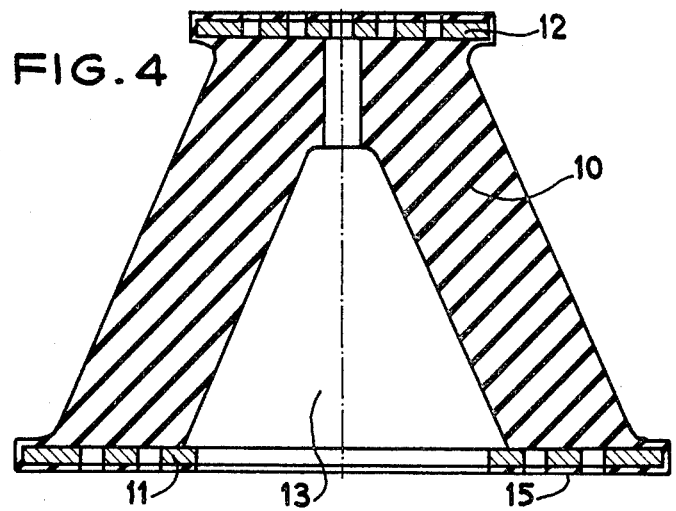
Figure 5:
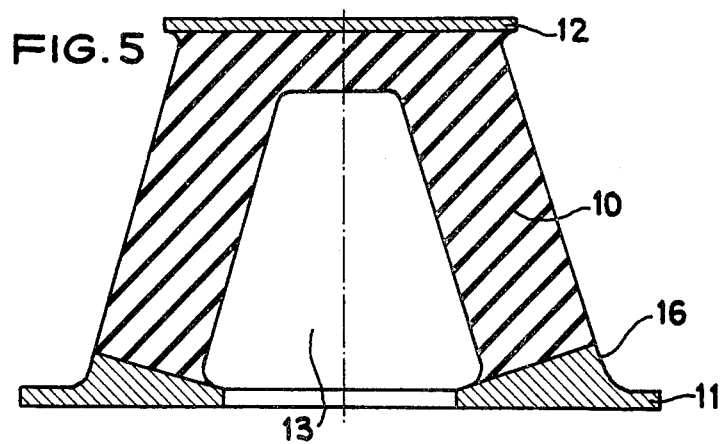
Figure 6:
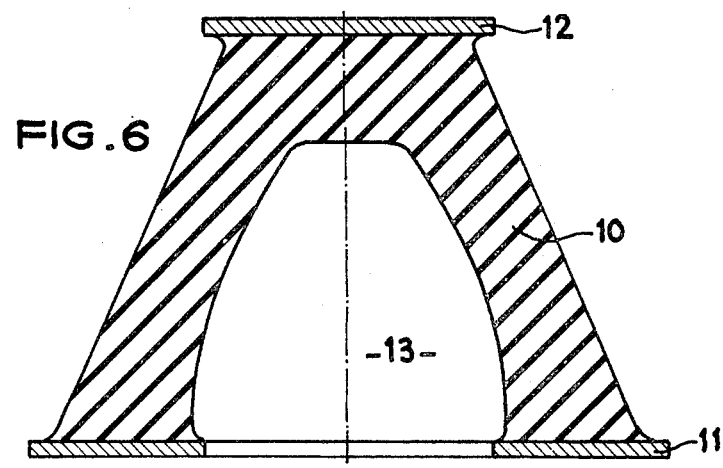

FIGS. 3 – 6 represent embodiments of the above-described shock absorber. In the case of these absorbers, the axial length H of the hollow section 13 is smaller than that H' of the element 10, the small base of which is formed by a rubber layer forming the base of the hollow section. To determine the shape and the proportion of the rubber element 10 of these shock absorbers, it is necessary to consider the outer diameter D of the truncated cone section of the element aligned with the base of the hollow section 13 as shown in FIG. 3. In FIG. 4, the base plates 11 and the end plates 12 are covered externally with a rubber covering 15 produced during molding to protect these plates from corrosion. In FIG. 5, the base plate 11 bears a conical sole 16 to which adheres the larger base of the element 10. In FIG. 6, the inner hollow section 13 is in the form of a truncated ogee of revolution, such that the thickness E of the wall decreases from the ends to reach a minimum towards the middle of the top of the hollow section. This shape is suitable for improving the flexibility of the shock absorber. The outer surface of the element 10 could also have a convex shape of revolution, preferably restricting the convexity so that the tangents of the curve remain between 60° and 85°.

FIGS. 7–12 show other embodiments in which the hollow conical element 10 is associated with a second elastic shock absorbing element 17 placed in the hollow section or recess 13 and designed to provide extra resistance, principally to axially compressive stresses exerted on the shock absorber.

Figure 7:
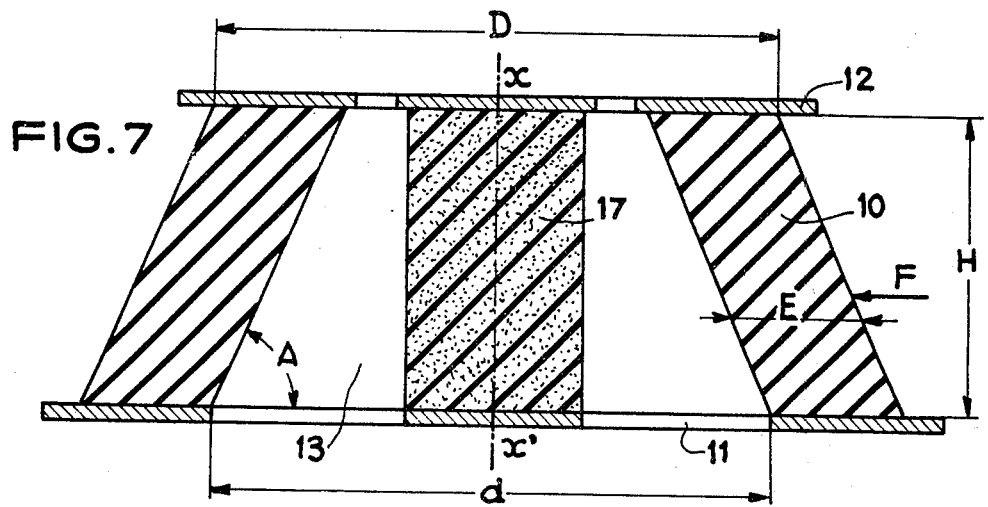
FIGS. 7 through 12 are elevational axial sectional views of still other embodiments of the shock absorbers in which the conical rubber element is combined with an additional shock absorbing element.

In the case of FIG. 7, this second shock absorbing element is constituted by a cylindrical block axially disposed in the recess 13, the ends of which adhere to the base and end plates 11 and 12.

These plates 11 and 12 may be constructed in a single part, possibly comprising openings for removing the molding cores. They may also consist of two separate concentric annular parts which are thereafter rendered integral by means of assembly parts which are joined during assembly of the shock absorber on the dock and on the shield. The secondary shock absorbing element may consist completely of an elastomer having the required elastic features; it may consist of solid rubber or cellular rubber.

Figure 8:
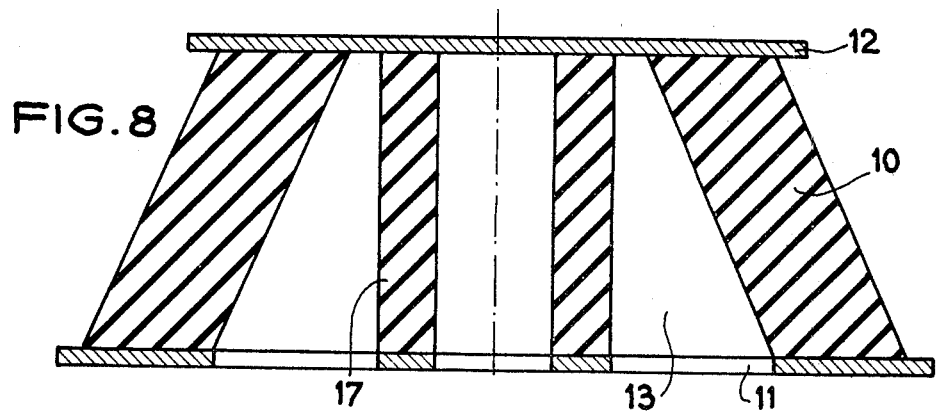
Figure 9:
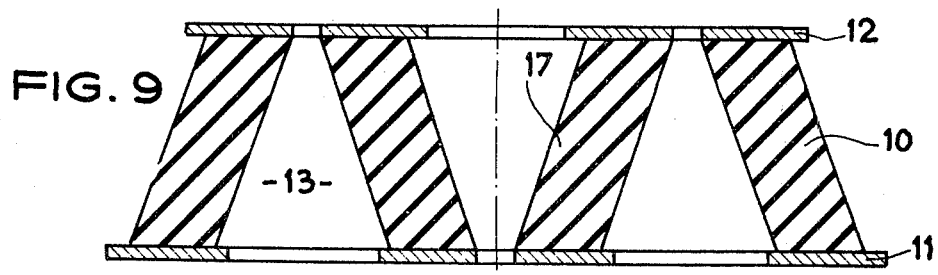

In FIG. 8, the secondary shock absorbing element consists of a hollow cylindrical sleeve, the ends of which adhere to metal plates 11 and 12. This sleeve is preferably made of solid rubber and instead of operating purely through compression under an axial stress as in the case of the block according to FIG. 7, it firstly operates through compression and then through buckling of its walls towards the outside. In FIG. 9, the secondary shock absorbing element 17 is in the form of a hollow rubber truncated cone axially disposed in the recess 13 but inverted with respect to the conical element 10, its small base adhering to the base plate 11 and its large base to the end plate 12.

The inclination and thickness of the walls of this hollow secondary cone 17 correspond to the main conical element 10.

Figure 10:
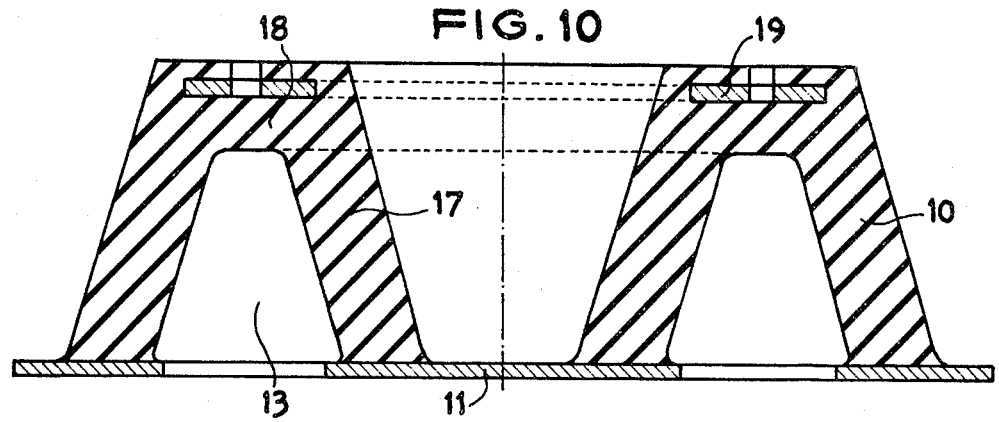

FIG. 10 shows a shock absorber similar to the preceding one except that upper end plate is replaced by a layer of rubber 18 forming the base of the recess 13 and uniting the conical wall of the element 10 with the conical wall of the secondary element 17. A rigid flange in the form of an annular plate 19 may be secured to this wall 18 or embedded therein, both for the purpose of reinforcing the same and to allow mounting of the shield, for example, by means of a series of holes through which securing bolts are passed.

Figure 11:
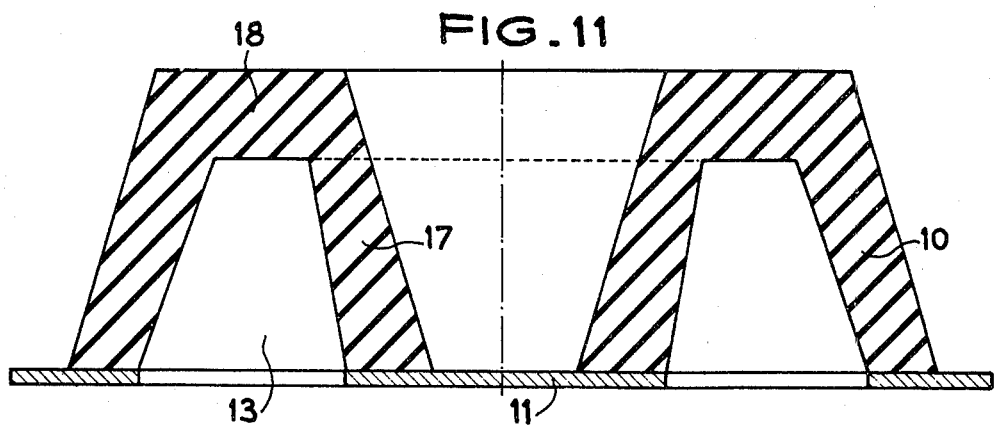

FIG. 11 shows another shock absorber similar to the preceding one but in which the radial thickness E of the conical wall of the main element 10 increases towards the small base to compensate for the reduction in the upright section of this wall owing to the conical shape. This compensation may be determined in such a way that the conical wall of the element 10 has an upright section of constant value at all levels of the recess 13 of this element. The same feature may be applied to the conical wall of the additional element 17 by increasing its thickness towards the small base. In this way, the shock absorbing unit may have a constant section at all levels between the base plate 11 and the bottom of the recess 13.

Figure 12:
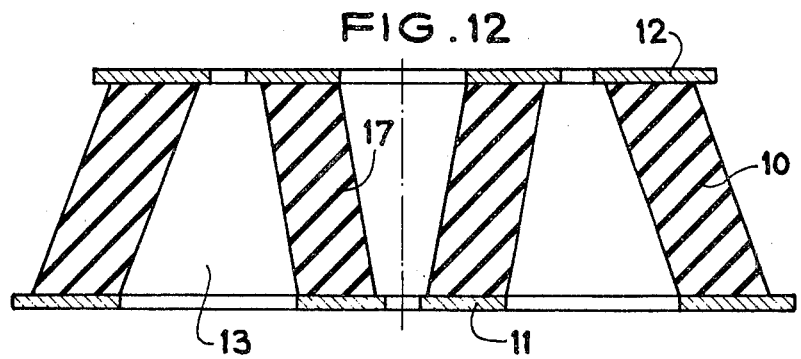

The shock absorber shown in FIG. 12 is similar to that of FIG. 9 excepting that element 10 and the secondary element 17 have different angles of inclination and wall thicknesses. In this case, the secondary element has a larger angle of inclination and a lesser thickness.

In the case of the complicated shock absorbers shown in FIGS. 7 – 12, the main conical element 10 is preferably constructed in the same way as the simple shock absorbers shown in FIGS. 1 – 6, that is, the axial height H of its recess 13 and its radial wall thickness are such that, with the inclination of this wall, the outer diameter D of its small base is approximately equal to the inner diameter $d$ of the wide base of the recess 13 so as to provide the features of bending and lateral stability. The same rule may also be applied to determine the shape and corresponding proportions of the secondary conical element 17 of the shock absorbers in FIGS. 9 – 12.

Figure 13:
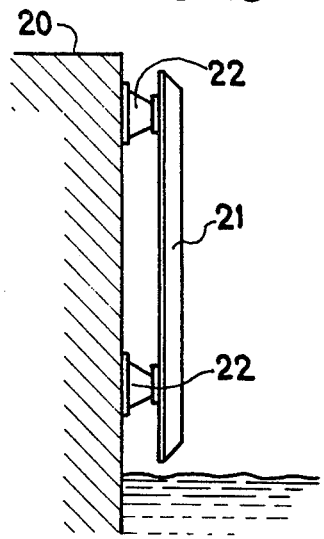
FIGS. 13 and 14 are diagrammatic views representing lateral and plan views of a mooring guard comprising the shock absorbers according to the present invention.
Figure 15:
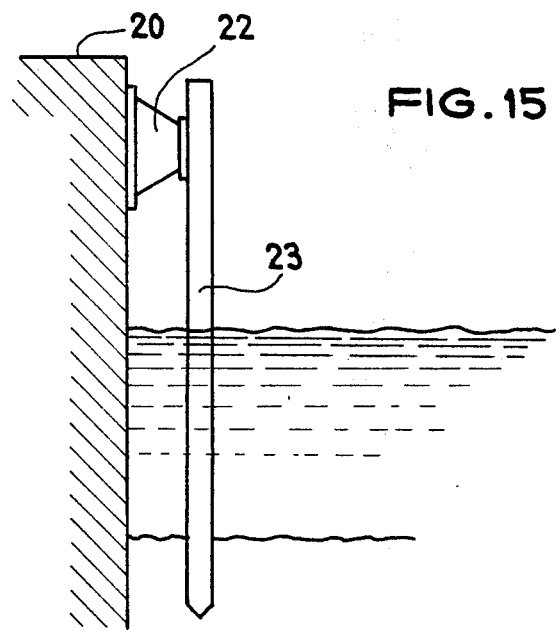
FIG. 15 is a similar view to FIG. 13 showing a different installation system.
Figure 14:
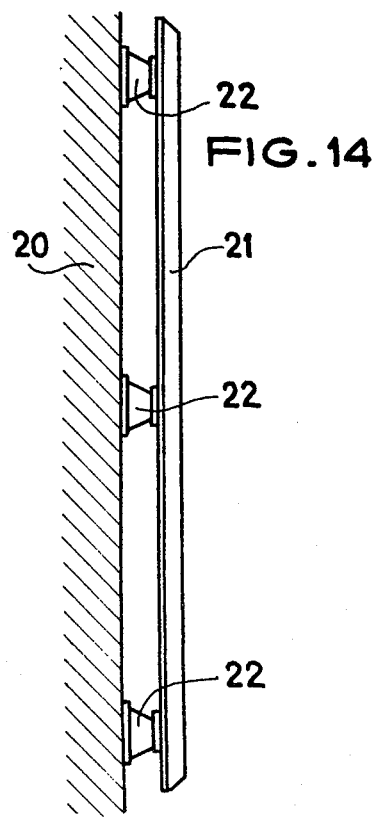

FIGS. 13, 14 and 15 show two embodiments of mooring guards for protecting a quay 20 by means of a mooring shield 2 disposed parallel to the vertical face of the quay. In the case of FIGS. 13 and 14, the shield 21 is supported by an appropriate number of shock absorbers 22 such as the hollow absorbers described above, secured to the quay by their base plates 11 and to the shield by their end plates 12. These shock absorbers enable the shield 21 to draw close to the quay when a mooring shock is exerted thereon by a ship; this stress comprising a component F which is normal for the quay. In addition, their lateral stability enables these shock absorbers to correctly bear the actual weight of the shield 21 and resist elastically the oblique mooring stresses comprising tangential components from any direction within a plane parallel to the vertical face of the quay, without resting on their sides. Owing to the shape of revolution of these shock absorbers, this aim is achieved without it being necessary to select an orientation as in the case of elongated shock absorbers in the form of rolls or sections. In FIG. 15, the shield consists of a series of vertical piles 23 sunk in the sea or river bed and attached at their upper ends to the shock absorbers 22.

Figure 16:
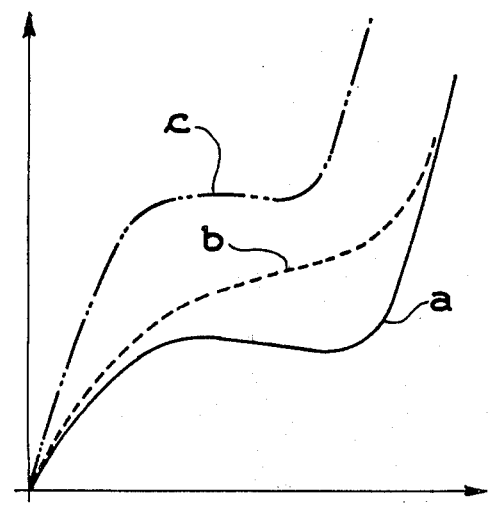
FIG. 16 is a diagram showing the shape of the load/deformation curves obtained with these shock absorbers.

FIG. 16 shows the load/deformation curves $a$, $b$, $c$, which can be obtained with shock absorbers such as those described which are subjected to axial compression. Curves $a$ and $b$ correspond to simple shock absorbers such as those illustrated in FIGS. 1 – 6 and curve $c$ corresponds to a complicated absorber of the type indicated in FIGS. 7 – 12. These curves show that when the stresses are minimal, a medium but progressive stiffness is obtained which is thereafter stabilized when the values of the stresses are average or high for a large part of the crushing action on the shock absorbers, making it possible to limit the value of the action exerted both on the dock and on the hull of the ship.

While the novel embodiments of the invention have been described, it will be understood that various omissions, modifications and changes in these embodiments may be made by one skilled in the art without departing from the spirit and scope of the invention.

What is claimed is:

1. A rubber shock absorber for a mooring guard comprising a hollow rubber element of revolution of generally truncated conical shape adhering to a base plate with an angle of inclination A of its wall in the order of 60°–85°, said rubber element having a hollow section of generally truncated conical shape with an axial height H and a conical wall with a radial thickness E such that the outer diameter D of the small base of the rubber element aligned with a small base at one end of the hollow section is substantially equal to the inner diameter $d$ of a large base at the other end of the hollow section so that the wall of the rubber element operates essentially through bending and extension towards the outside under a crushing stress comprising an axial component and provides lateral stability to counteract the tangential components of this stress.

2. A shock absorber according to claim 1 wherein the ratio H/E between the axial height H and the radial thickness E of the wall of the rubber element is between 2 and 4.

3. A shock absorber according to claim 1 wherein the conical wall of the rubber element is of constant thickness.

4. A shock absorber according to claim 1, wherein the conical wall of the rubber element is of decreasing thickness with a minimum value towards the middle of the height of the hollow section.

5. A shock absorber according to claim 1, wherein the conical wall of the rubber element increases in thickness towards said small base.

6. A shock absorber according to claim 1, wherein the hollow rubber element contains in said hollow section a second shock absorbing element which is resistant to axial compression stresses exerted on the hollow rubber element, said second shock absorbing element being arranged axially within said hollow section.

7. A shock absorber according to claim 6, wherein the axial length of the second shock absorbing element is equal to the axial length of the hollow section in the hollow rubber element.

8. A shock absorber according to claim 6, wherein one end of the second shock absorbing element also adheres to the base plate adhering to the hollow element.

9. A shock absorber according to claim 8, wherein the other end of the second shock absorbing element adheres to an end plate adhering to the small base of the hollow element.

10. A shock absorber according to claim 6, wherein the second shock absorbing element is a hollow rubber sleeve having a cylindrical wall, said sleeve operating by bending said cylindrical wall towards the outside under the effect of axial compression.

11. A shock absorber according to claim 6, wherein the second shock absorbing element is a hollow rubber truncated cone having a small base at one end and a large base at the other end.

12. A shock absorber according to claim 11, wherein the small base of the inner truncated cone is located on the side of the base plate adhering to the hollow rubber element and the large base is located on the side of an end plate adhering to the small base of the hollow element.

13. A shock absorber according to claim 12, wherein the small base of the truncated cone is located on the side of the base plate adhering to the hollow rubber element and the large base is located on the side of an upper base of the hollow section in the hollow rubber element.

14. A shock absorber according to claim 6, wherein one end of the second shock absorbing element adheres to a separate base plate which is made integral therewith during assembly of the shock absorber on a stationary part of a dock.

15. A shock absorber according to claim 8, wherein the other end of the second shock absorbing element is integral with an end wall forming a base of the hollow section in said hollow element.

16. A shock absorber according to claim 6, wherein the second shock absorbing element is a solid cylindrical rubber block.

17. A shock absorber according to claim 1, wherein said base plate is made of metal.

18. A shock absorber for a mooring guard comprising a hollow rubber element having an axis of revolution in a generally truncated conical shape, and a metallic base plate adhesively secured to an end of said rubber element, said rubber element having a conical wall with an angle of inclination A on the order of 60° – 85° defining a hollow section of generally truncated conical shape therein, the axial length H of the hollow section and the radial thickness E of the conical wall being so dimensioned that the outer diameter D of the small base of the rubber element aligned with an upper base at one end of the hollow section is substantially equal to the inner diameter $d$ of a large base at the other end of the hollow section whereby the conical wall of the hollow rubber element operates essentially through bending and extension towards the outside under a crushing stress comprising an axial component and provides lateral stability to counteract the tangential components of said stress.

19. A shock absorber according to claim 18, wherein the outer diameter D of said small base is that of the truncated cone section of the hollow rubber element aligned with the upper base of the hollow section.

20. A shock absorber according to claim 18, wherein said hollow rubber element has two ends parallel to each other and perpendicular to said axis of rotation.

21. The shock absorber according to claim 18, wherein a metallic end plate is adhesively secured to the other end of said hollow element.

22. A shock absorber according to claim 18, wherein the ratio H/E between the axial height H and the radial thickness E of the wall of the rubber element is between 2 and 4.

23. A shock absorber according to claim 18, wherein the hollow rubber element contains in said hollow section a second shock absorbing element which is resistant to axial compression stresses exerted on the hollow rubber element, said second shock absorbing element being arranged axially within said hollow section.

* * * * *